(12) United States Patent
Meredith et al.

(10) Patent No.: US 7,019,890 B2
(45) Date of Patent: Mar. 28, 2006

(54) HYBRID ELECTRO-ACTIVE LENS

(75) Inventors: Gerald Meredith, Tucson, AZ (US);
Bernard Kippelen, Decatur, GA (US);
David Mathine, Tucson, AZ (US)

(73) Assignee: E-Vision, LLC, Roanoke, VA (US)

( * ) Notice: Subject to any disclaimer, the term of this patent is extended or adjusted under 35 U.S.C. 154(b) by 0 days.

(21) Appl. No.: 10/924,619

(22) Filed: Aug. 24, 2004

(65) Prior Publication Data

US 2005/0073739 A1    Apr. 7, 2005

Related U.S. Application Data

(60) Continuation-in-part of application No. 10/863,949, filed on Jun. 9, 2004, which is a division of application No. 10/263,707, filed on Oct. 4, 2002, now abandoned.

(60) Provisional application No. 60/518,316, filed on Nov. 10, 2003, provisional application No. 60/518,303, filed on Nov. 10, 2003, provisional application No. 60/509,522, filed on Oct. 9, 2003, provisional application No. 60/331,419, filed on Nov. 15, 2001, provisional application No. 60/326,991, filed on Oct. 5, 2001.

(51) Int. Cl.
*G02F 1/29* (2006.01)
*G02B 26/08* (2006.01)

(52) U.S. Cl. .................. 359/298; 359/315; 359/245; 359/642

(58) Field of Classification Search ............. 359/298, 359/642, 315, 319, 320, 245, 254; 349/13, 349/200
See application file for complete search history.

(56) References Cited

U.S. PATENT DOCUMENTS

| 4,795,248 | A | * | 1/1989 | Okada et al. | 351/158 |
| 5,424,927 | A | * | 6/1995 | Schaller et al. | 362/157 |
| 6,191,881 | B1 | * | 2/2001 | Tajima | 359/254 |
| 6,191,882 | B1 | * | 2/2001 | Gelbart | 359/291 |

* cited by examiner

*Primary Examiner*—Ricky L. Mack
*Assistant Examiner*—Brandi N. Thomas
(74) *Attorney, Agent, or Firm*—Hunton & Williams LLP

(57) ABSTRACT

An electro-active lens is disclosed. The lens includes at least one electro-active cell to provide a lens having at least two focal lengths, the electro-active cell capable of adjusting its focal length based on voltages applied to the electro-active cell. The voltage is supplied by an alternating current source, including a flying capacitor circuit. The electro-active lenses reduce birefringence through the use of a single cholesteric liquid crystal electro-active cell.

11 Claims, 13 Drawing Sheets

HYBRID ELECTRO-ACTIVE LENS

RELATED APPLICATIONS

This application claims priority to U.S. Provisional Application No. 60/509,522 filed on Oct. 9, 2003, U.S. Provisional Application No. 60/518,303 filed on Nov. 10, 2003, and U.S. Provisional Application No. 60/518,316 filed on Nov. 10, 2003. This application is also a continuation-in-part of U.S. application Ser. No. 10/863,949 filed Jun. 9, 2004. The '949 Application is a divisional application of U.S. application Ser. No. 10/263,707 filed Oct. 4, 2002 now abandoned, which claims the benefit of U.S. Provisional Application No. 60/326,991 filed on Oct. 5, 2001, and U.S. Provisional Application No. 60/331,419 filed on Nov. 15, 2001. All of the preceding applications are hereby incorporated by reference in their entirety.

FIELD OF THE INVENTION

The present invention generally regards lenses. More specifically the present invention regards composite electro-active lenses.

BACKGROUND OF THE INVENTION

Generally, a conventional lens has a single focal length to provide a particular visual acuity. The lens may be produced for a particular lens wearer or application where there is no change in visual acuity or no need to modify the visual acuity for different viewing distances. As such, a conventional lens may provide limited use.

A bifocal lens was created to provide multiple focal lengths for the lens wearer or application where there is a need for varying visual acuity, for example, for reading and distance vision. However, this bifocal lens has fixed focal length regions, which also provides limited use.

In each of these examples, the lens is ground from a single material.

DETAILED DESCRIPTION OF EXEMPLARY EMBODIMENTS

Embodiments of an electro-active lens of the present invention may be a composite lens made up of various components, including optically transmissive material, e.g., liquid crystals, that may have variable refractive indices. The variable focal lengths may be provided, for example, by diffractive patterns etched or stamped on the lens or by electrodes disposed on the optically transmissive material of the lens. The diffractive patterns refract light entering the optically transmissive material, thereby producing different amounts of diffraction and, hence, variable focal lengths. The electrodes apply voltage to the optically transmissive material, which results in orientation shifts of molecules in the material, thereby producing a change in index of refraction, this change in index of refraction can be used to match or mismatch the index of the liquid crystal with the material used to make the diffractive pattern. When the liquid crystal's index matches that of the diffractive patterns material the diffractive pattern has no optical power and therefore the lens has the focal lens of the fixed lens. When the index of refraction of the liquid crystal is mismatched from that of the material used to make the diffractive pattern, the power of the diffractive pattern is added to the fixed power of the lens to provide a change in the focal length of the lens. The variable refractive indices may advantageously allow a lens user to change the lens to a desired focus, have bi-, tri-, or multi-focal viewing distances, etc. in a single lens. The electro-active lens may also reduce or eliminate birefringence, which has been known to be a problem with some lens. Exemplary applications of an electro-active lens include eyeglasses, microscopes, mirrors, cameras, rifle sights, phoropters, binoculars, and any other optical device through which a user may look.

Figure 1:
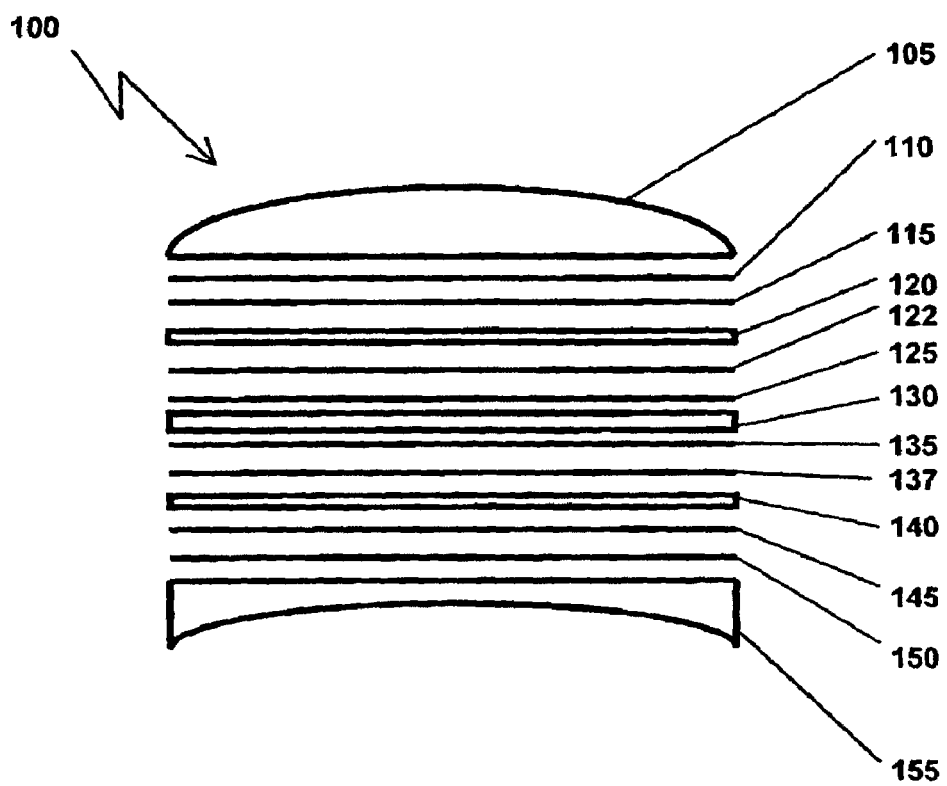
FIG. 1 is an exploded cross-sectional view of an electro-active lens in accord with an embodiment of the present invention.

FIG. 1 shows an embodiment of an electro-active lens in accord with the present invention. This embodiment includes two refractive cells that may be used to reduce or eliminate birefringence in the lens. The refractive cells may be aligned orthogonal to each other if the electro-active material is, by way of example, a nematic liquid crystal, thereby reducing or eliminating the birefringence created by the aligned liquid crystal. This embodiment may provide applied voltage to produce variable refractive indices in the lens. The embodiment may be used in eyeglasses, for example, to allow the eyeglass wearer to change the refractive index and, hence, focus. The first refractive cell of electro-active lens 100 may include electrodes 110, 125, alignment layers 115, 122, and liquid crystal layer 120. The second refractive cell of electro-active lens 100 may include electrodes 135, 150, alignment layers 137, 145, and liquid crystal layer 140. Separator layer 130 may separate the first and second cells. Electro-active lens 100 may also include front and rear substrate components 105, 155, between which the two refractive cells may be disposed. Electrodes 110, 125, 135, 150 may apply voltage to liquid crystal layers 120, 140 to produce the variable refractive indices.

Front component 105 may possess a base curvature for producing distance vision in electro-active lens 100. Front component 105 may be made from optical grade glass, plastic, or a combination of glass and plastic, for example. The back of front component 105 may be coated with a transparent conductor such as ITO, tin oxide, or other electrically conductive and optically transparent materials, to form electrode 110. In embodiments where the electro-active area of the lens is smaller then the entire lens assembly 100, electrode 110 may be solely placed over the electro-active area of lens 100 to minimize power consumption.

Electrode 110 may be coated with alignment layer 115 to provide orientation to liquid crystal layer 120 or any other variable index polymeric material layer. The molecules in liquid crystal layer 120 may change their orientation in the presence of an applied electrical field, resulting in a change in the index of refraction experienced by an incident ray of light. Liquid crystal layer 120 may be nematic, smectic, or cholesteric, for example. Exemplary nematic phase crystals include 4-pentyl-4'-cyanobiphenyl (5CB) and 4-(n-octyloxy)-4'-cyanobiphenyl (8OCB). Other exemplary liquid crystals include the various compounds of 4-cyano-4'-(n-alkyl)biphenyls, 4-(n-alkoxy)-4'-cyanobiphenyl, 4-cyano-4"-(n-alkyl)-p-terphenyls, and commercial mixtures such as E7, E36, E46, and the ZLI-series made by BDH (British Drug House)-Merck.

Another alignment layer 122 may be disposed on the other side of liquid crystal layer 120, typically over electrode 125. Electrode 125 may be produced in a similar manner as electrode 110 and may complete one cell of electro-active lens 100. The driving voltage waveform may be applied across electrodes 110 and 125.

After separator layer 130, the next cell may be disposed such that it is orthogonally aligned from the first cell. Separation layer 130 may support electrode 125 of the electro-active lens' first cell on one side and electrode 135 of the electro-active lens' second cell on the opposite side. Separation layer 130 may be constructed from an optical grade plastic, such as polymerized allyl diglycol carbonate, also known as CR39, glass, or other polymeric materials. The electro-active material in the second cell is preferably aligned to the orientation of alignment layers 137, 145 applied to the electrodes 135, 150. A preferred orientation may be such that alignment layers 115 and 122 in the first cell are orthogonally oriented to alignment layers 137 and 145 in the second cell. The second cell may also include liquid crystal layer 140 as described above. The second cell may be completed with electrode 150 deposited on rear component 155. Rear component 155 may be constructed from similar materials as front component 105 and may possess a curvature that completes the distance power of electro-active lens 100.

If the distance power of electro-active lens 100 includes astigmatic correction, either front component 105 or rear component 155, or both, may be toric and properly oriented relative to the astigmatic correction that the lens wearer needs.

In an alternate configuration, a single alignment layer may be used in each cell. In this embodiment, either alignment layer 120, 122 may be removed from the first cell of electro-active lens 100 and either alignment layer 137, 145 may be removed from the second cell. Alternatively, if electrodes 110, 125, 135, 150 have an orientation, then electrodes 110, 125, 135, 150 may align liquid crystal layers 120, 140. Hence, all alignment layers 120, 122, 137, 145 may be removed.

Optical power can be produced in embodiments of the present invention by creating diffractive patterns on the back surface of front component 105, the front surface of rear component 155, or both. Optical power can also be produced by creating diffractive patterns on one or both sides of separator layer 130 instead of, or in addition to, diffractive patterns placed on components 105, 155. In fact any combination of placement of diffractive patterns described above is possible and considered within the scope of the present invention.

Diffractive patterns can be created using a number of techniques including machining, printing, or etching. When diffractive patterns are used to produce the optical power, liquid crystal layers 120, 140 can be used to match the refractive index of all the layers in order to hide the additive power of the diffractive pattern in one index state, and to mismatch the refractive index in all the layers in order to reveal the power of the diffractive pattern in the other index state, where each state may be defined by whether the applied voltage (or electric field) is on or off.

Figure 2:
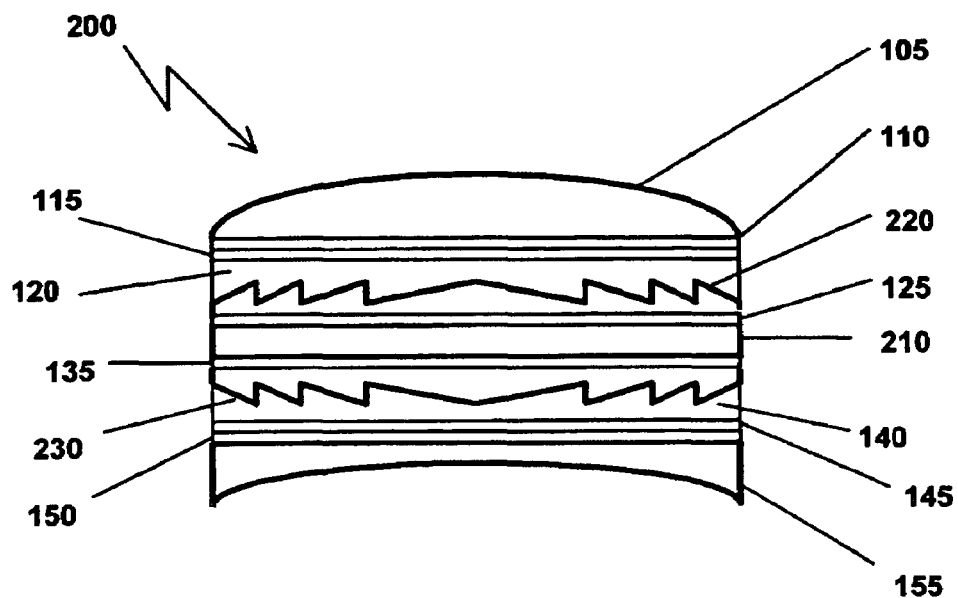
FIG. 2 is a side cross-sectional view of an electro-active lens in accord with an alternative embodiment of the present invention.

FIG. 2 shows an alternate embodiment of an electro-active lens in accord with the present invention. This embodiment includes a construction of a double liquid crystal cell 200 of an electro-active lens, including diffractive patterns for producing variable optical power. This embodiment may be used in eyeglasses, for example, to provide variable optical power throughout the entire lens. This embodiment may also advantageously alleviate problems associated with using diffractive patterns in an electro-active lens, e.g., oblique electric field lines, polymer substrate birefringence, and difficulty of lens component index matching. Double liquid crystal electro-active cell 200 may include front and rear substrate components 105, 155, electrodes 110, 125, 135, 150, alignment layers 115, 145, liquid crystal layers 120, 140, transparent conductor coated substrate 210, and polymer surfaces 220, 230.

Front and rear components 105, 155, electrodes 110, 125, 135, 150, alignment layers 115, 145, and liquid crystal layers 120, 140 may perform similar functions and be constructed of similar materials as those in FIG. 1. In this embodiment, front component 105 may be coated with a transparent conductor to form electrode 110. Electrode 110 may be coated with alignment layer 115. Liquid crystal layer 120 may be adjacent to alignment layer 115. As in FIG. 1, molecules of liquid crystal layer 120 may change their orientation in the presence of an applied electrical field.

Polymer surface 220 may include a diffractive lens pattern etched or stamped on a surface of polymer 220. The diffractive pattern on polymer surface 220 may be fitted against a diffractive pattern etched or stamped on a surface of liquid crystal layer 120. Electrode 125 may be adjacent to polymer surface 220 and formed from, e.g., ITO. Electrode 125 may be deposited on one side of thin substrate 210, made from, by way of example only, glass or ophthalmic grade plastic. Substrate 210 may be birefringence-free. Electrode 135 may be deposited on the other side of substrate 210 and formed from, e.g., ITO.

Polymer surface 230 may be adjacent to electrode 135. Polymer surface 230 may include a diffractive lens pattern etched or stamped into a surface of polymer 230. The diffractive pattern of polymer surface 230 may be placed against the liquid crystal layer 140. As in FIG. 1, molecules of liquid crystal layer 140 may change their orientation in the presence of an applied electrical field. Alignment layer 145 may be disposed on the electrode 150. Electrode 150 may be adjacent to alignment layer 145 and deposited on rear component 155 to complete double liquid crystal electro-active cell 200.

PMMA (or other suitable optical polymeric material) may be spin-coated in a range of 2 to 10 microns thickness, with a preferable range of 3 to 7 microns, on both sides of substrate 210 after electrodes 125, 135 have been deposited on substrate 210.

Additionally, liquid crystal alignment surface relief (not shown) in a form of sub-micron gratings may be stamped or etched onto diffractive lens-patterned surfaces 220, 230.

There may be many advantages to this embodiment. First, electrodes 125, 135 underneath the PMMA layers may help maintain perpendicular, non-oblique electric field lines to opposing electrodes 110, 150. This may overcome the de-focusing phenomenon of oblique E-field lines present in designs where transparent conductors are placed directly over the diffractive pattern. The de-focusing phenomenon may occur when the oblique field lines generate an oblique electric field near the diffractive lens surfaces, preventing a full 90° liquid crystal tilt angle at these surfaces upon the application of an electric field. This in turn may result in the appearance of a second "ghost" focus in the On-State, thus degrading the performance of the electro-active lens. Embodiments of the present invention may overcome this "ghost" focus.

Second, the use of the inventive buried electrode structure may provide a solution to the matching of the refractive indices of liquid crystal layers 120, 140 to that of the contacting substrate, in this case lens-patterned polymeric surfaces 220, 230. Thus, where transparent conductors are placed directly over the diffractive pattern and include, for example, an ITO coating ($n_{ITO} \approx 2.0$), the transparent conductors may not index-match the liquid crystal's ordinary index (typically $n_{LC}=1.5$). This can make electrodes 125, 135 visible to the naked eye and present a problem with the cosmetic quality of the electro-active lens. Accordingly, in the embodiment of FIG. 2, liquid crystal layers 120, 140 may now have a matched index to the PMMA substrate, which may be ($n_{Sub} \approx 1.5$), thereby "hiding" electrodes 125, 135 from view.

Third, using patterned, spin-coated PMMA on a birefringence-free substrate, such as glass or ophthalmic grade plastic, may be used to solve the problem of substrate birefringence. That is, the substrate itself may be relatively free from birefringence and the thin, spun-coat PMMA may also have negligible birefringence.

Figure 3:
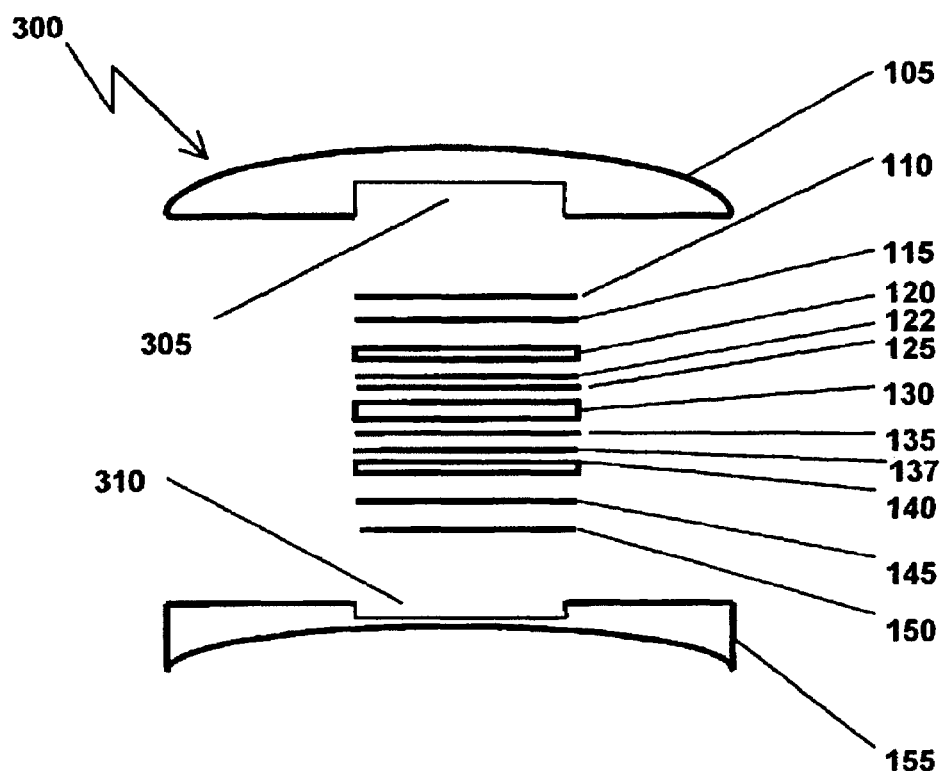
FIG. 3 is an exploded cross-sectional view of an electro-active lens in accord with another alternative embodiment of the present invention.

FIG. 3 shows another alternate embodiment of an electro-active lens in accord with the present invention. In this embodiment, the electro-active region of an electro-active lens 300 covers only a portion of lens 300. This embodiment may be used in bi-focal eyeglasses, for example, to provide a variable refractive index in only a portion of the lens. In FIG. 3, lens 300 includes dual cells and multiple layers, as in FIG. 1. The layers may be disposed within recesses 305 and 310 on front and rear components 105 and 155, respectively. Recesses 305, 310 may accommodate the layers, allowing the layers to be easily sealed in lens 300. Components 105, 155 may be made from glass or ophthalmic grade plastic, for example.

Embodiments may include a fail-safe mode, in which the electro-active lens reverts to a plano, unmagnified state when voltage is no longer applied. As such, the electro-active lens provides no optical power in the absence of electrical power. This mode is a safety feature for instances where the power supply fails.

In an embodiment of the present invention, the chromatic aberrations in the cell may be reduced by designing one cell to transmit light with a wavelength slightly longer than green light (550 nm) and the other cell for a wavelength slightly shorter than green light. In this embodiment, the two cells can correct both the birefringence and the chromatic aberration at the same time.

Without a significant difference in index of refraction between the diffractive pattern surface and the liquid crystal layer, there may be no power contributed to the lens by the diffractive pattern. In such embodiments the electro-active power of lens is created by the diffractive pattern(s) when there is a significant amount of index difference between the liquid crystal and the diffractive pattern surface.

Figure 4:
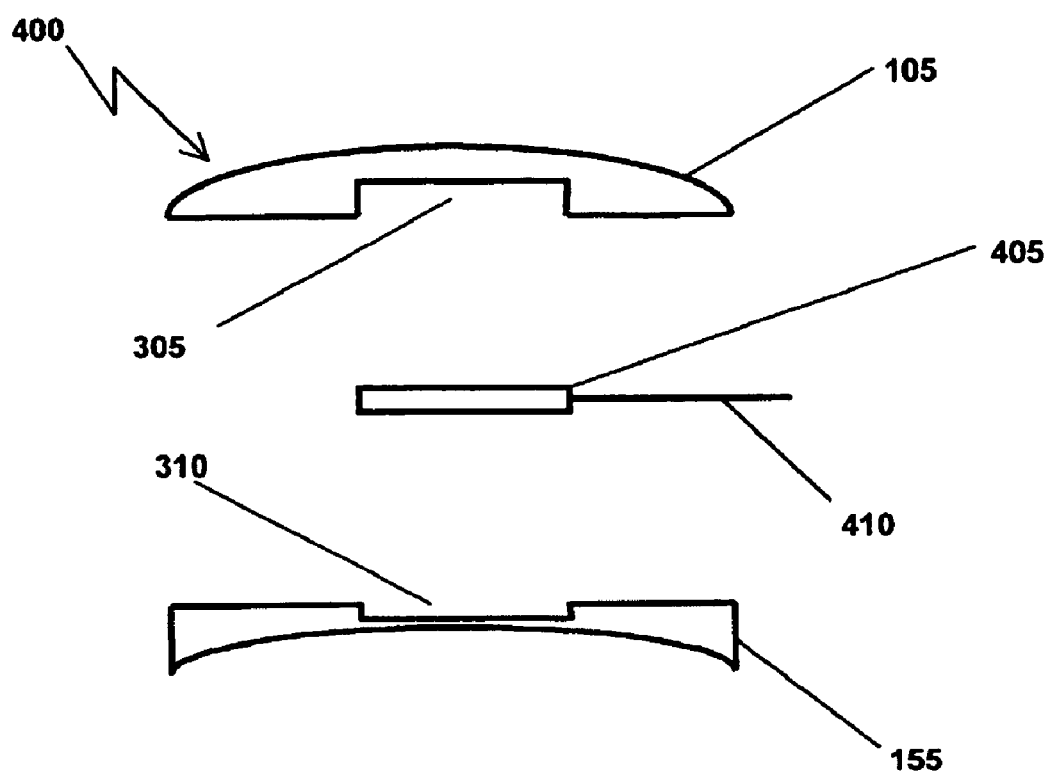
FIG. 4 is an exploded cross-sectional view of an electro-active lens in accord with another alternative embodiment of the present invention.

FIG. 4 shows another embodiment of an electro-active lens in accord with the present invention. In this embodiment, the electro-active region of electro-active lens 400 is encapsulated in casing 405 and covers only a portion of lens 400. This embodiment may also be used in bi-focal eyeglasses, for example, to provide a variable refractive index in only a portion of the lens. In this embodiment, electro-active lens 400 includes front and rear components 105, 155, a casing 405, and electrical connectors 410. Front component 105 includes a recess 305 and rear component 155 includes a recess 310. The layers of electro-active lens 400 may be encapsulated in casing 405. Electrical connectors 410 made from transparent conductors may be placed on a thin plastic strip and connected to casing 405. The plastic strip may be mostly index-matched to components 105, 155. Voltage may be applied to casing 405 through electrical connectors 410 in order to change the refractive indices of the electro-active region. Casing 405 may be placed between recesses 305, 310. Encapsulated casing 405 may also be molded into a semi-finished blank that may be surfaced to a desired distance power. Alternatively, encapsulated casing 405 may be placed in recess 310 of rear component 155 which could later be surface cast to lock casing 405 in place and complete the desired distance power. Casing 405 may be made of plastic, glass, or other suitable optical grade material and index-matched to the refractive index of components 105, 155.

Figure 5:
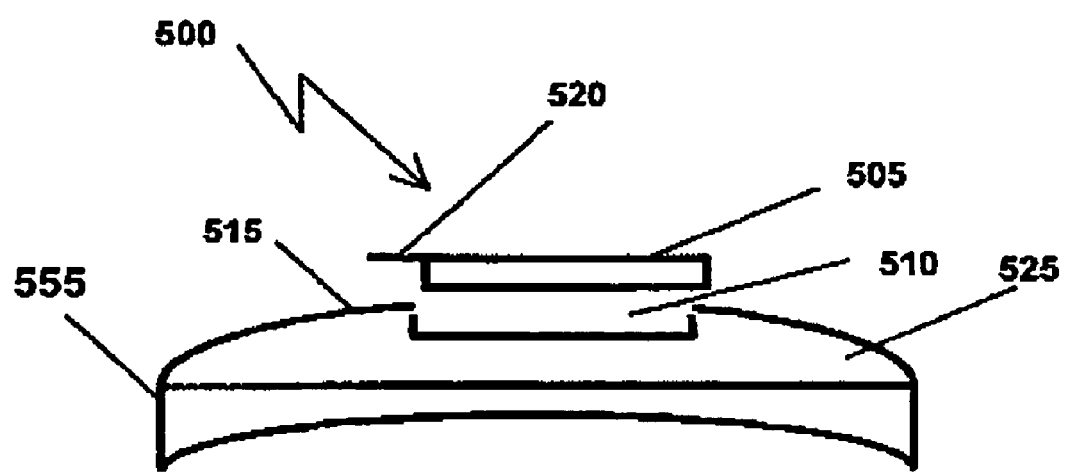
FIG. 5 is a side cross-sectional view of an electro-active lens in accord with another alternative embodiment-of the present invention.

FIG. 5 shows another alternate embodiment of an electro-active lens in accord with the present invention. In this embodiment, an electro-active lens 500 may be formed by placing an electro-active lens capsule 505 into a recess 510 on top of the electro-active lens' front component 525. This embodiment may also be used for bi-focal eyeglasses, for example, to provide a variable refractive index in only a portion of lens 500. In this embodiment, the electro-active region may be placed on top of a lens and then sealed onto the lens to create a continuous surface. Thin film conductors 520 may be attached to lens capsule 505 and electrically connected to a conductive contact 515 on the surface of front component 525. Rear component 555 may be attached to front component 525 to help provide a desired distance power. After electro-active capsule 505 is placed in recess 510 of front component 525, the front surface of front component 525 may be sealed using, for example, a surface casting technique with index matched material or simply filled with index-matched material and polished to an optical finish. This structure may advantageously provide mechanical stability, ease of edging and fitting into a lens frame, and ease of electrical connection to the electro-active material, in addition to reducing or eliminating birefringence.

Figure 6:
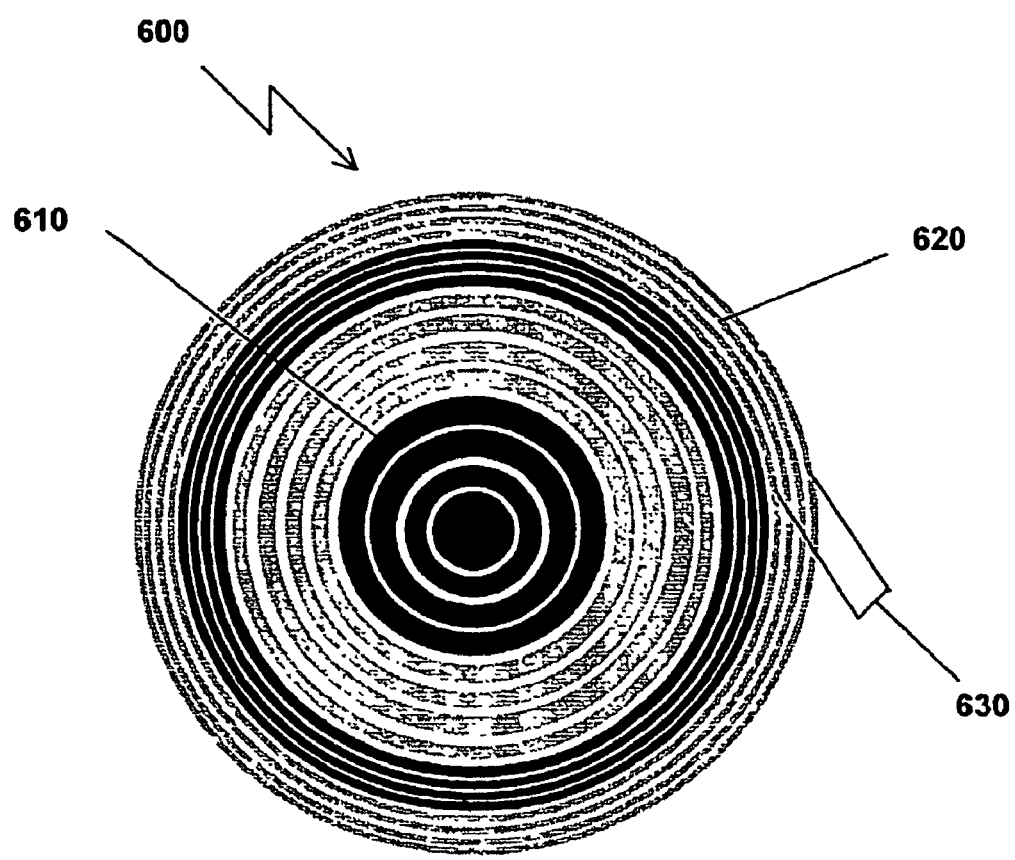
FIG. 6 is a front view of electrical concentric loops used to activate an electro-active lens in accord with another alternative embodiment of the present invention.

FIG. 6 shows an embodiment of electrical concentric loops that may be applied to electro-active material in an electro-active lens in accord with the present invention. Electrical concentric loops 600 may be the electrodes used in an electro-active lens to apply voltage to the lens. For example, in FIG. 1, loops 600 may be positioned in place of electrodes 110, 125, 135, 150.

In FIG. 6, the loops emulate a diffractive pattern with integer multiples of $2\pi$ phase wrapping. Phase wrapping is a phenomenon in which the phase of the light is repeated (or "wrapped") at various locations or zones along the electro-active lens diameter. The patterned electrode structure 600 includes four (4) phase-wrapping zones. The more central electrodes 610 may be thicker than the electrodes 620 further from the center. As can be seen from FIG. 6, a group of four electrodes 630 makes up each phase-wrapping zone. While four electrodes are used in each zone in FIG. 6, more electrodes can be used in each zone to increase the optical efficiency of the device.

The four electrodes in the lens may be four patterned ones. Alternately, the electrodes may be two patterned and two solid ones. The second patterned electrodes may be used to dither the focusing of the electro-active lens to compensate for strong chromatic aberration. Additionally, this embodiment may provide for sequential focusing strength without complex electrical interconnects.

Electrical contacts (not shown) can be made to the electrodes through thin wires or conductive strips at the edge of the lens or by a set of conducting vias down through the lens. The electrodes 600 may be patterned in either or both of the two cells within the lens. In a dual cell design, it is also possible to use one cell with diffractive patterns and one cell with patterned electrodes so long as the powers are matched enough to address the birefringence.

When creating a diffractive pattern with concentric loop electrodes 600, a refractive material activated by electrodes 600 may impress a phase transformation upon an incident light wave. This embodiment emulates the conventional lens by using a flat structure with variable phase retardation from the center of the structure outward. The variable phase retardation may be accomplished by applying variable voltages to different electrodes 600, which in turn, modify the refractive index profile of the electro-active material. An automatic fail-safe mode may provide no power in the electro-active material in the absence of applied voltage, so the electro-active lens automatically reverts to plano in the event of a power failure.

The electro-active portion of the lens may be thin, for example less than a fraction of a millimeter in total thickness. In order to attain this thinness, the present invention makes use of the fact that, for sinusoidally varying waves, phase shifts of $2\pi$ multiples carry no physical significance. In other words, the phase of the incoming light may be "wrapped" along convenient closed curves within the lens. The circular zone boundaries of the classical zone plate are examples. Thus useful phase transformations and significant optical power can be achieved when the controllable throw of an electro-active lens is only a few waves of retardation.

The spatial variations of the phase retardation in the electro-active lens may be determined based on the particular application. The variations may be determined by the spacing of electrodes 600, which can be electronically addressed, powered, and established on the interior of the electro-active lens. In an exemplary nematic liquid crystal configuration, where the crystals act as uniaxial media, light traveling through the crystal may be restricted to extraordinary polarization. Otherwise, two liquid crystal cells may be used in tandem, rotated 90 degrees out of phase from normal in order to swap their ordinary and extraordinary directions of polarization, thus eliminating birefringence. Each of these configurations provides a particular index of refraction. To avoid long-term decomposition of the liquid crystals, electrical polarization between dual cells, and random transient voltages in the spaces between electrodes, the electrodes may be driven with frequency- and phase-synchronized AC voltages. Exemplary frequencies include 10 kHz and exemplary high voltages range from 5 to 10 V, preferably a maximum between 6 and 8 V. Alternatively, lower voltages are desirable for compatibility with low power. CMOS drive circuitry may be used, such that electro-active materials may provide adequate index changes at less than 5 or 6 volts.

In one embodiment, phase-wrapping zones may include few electrodes, with zones closer together. Alternatively, electrodes with higher resistance material may be used to smooth fringing fields (so called "phase sag"). In another embodiment, a second phase transformation may be cascaded onto the first by patterning another electrode 600 within the same cell, rather than using it simply as a continuous ground plane.

An exemplary fabrication method for an electro-active lens of the present invention includes fabricating a window into the electrode pattern of the lens and interconnecting the electrodes and the electrical contact pads. A second window may be connected to an electrical ground. Next, liquid crystal alignment layers may be deposited on both windows and treated. Two appropriately oriented windows may be made into a liquid crystal cell by establishing spacing between the windows with glass-spacer-containing epoxy, for example, and then filling the established spacing with the liquid crystals and sealing the windows together with epoxy. The windows may be laterally shifted to make electrical connection by simple pressure attachments to the electrical contact pads. The electrode and interconnection patterns may be established using photolithography with CAD generated masks. Developing, etching, and deposition techniques may be used. In an alternate design, multi-layers with simple conducting inter-level connecting vias may be used to avoid interconnection crossings.

In designing electrodes 600, the electrode zone boundaries may be placed at multiples of $2\pi$, consistent with conventional phase wrapping. So for boundary placements at every $2 m\pi$, the radius of the nth wrapping is given by the expression:

$$\rho_{nm} = [2\ nm(\lambda f)]^{1/2} \quad (1)$$

The zone boundaries of the diffractive lens are calculated using the paraxial approximation to give $$r_j = [2j\lambda f]^{1/2} \quad (1a)$$

where $r_j$ is the zone radius, j is the zone index, lambda is the wavelength and f is the focal length of the diffractive lens.

Each zone contains multiple electrodes. If there are p electrodes per zone, then Equation (1) can be modified to $$\rho_{lnm} = [2\ km(\lambda f)/p]^{1/2} \quad (2)$$

$$k = [p(n-1)+l] = 1, 2, 3, 4, \quad (3)$$

where I is an index running from 1 to p for the intra-zone electrodes and k is an index which counts sequentially outward, maintaining the sequence of electrode boundaries as square roots of the counting numbers k. To raise adjacent electrodes to different voltages, insulating spaces may be inserted between the electrodes. The sequence of electrodes may be separated by circles with radii increasing as the square root of the counting numbers. All electrodes with the same index I may be ganged together with electrical connections shared between them since they are intended to produce the same phase retardation, thereby reducing the number of different electrical connections to the electrodes.

Electrical buses may be used effectively to gang electrodes together. Based on zones that are defined by $2\pi$ phase wrapping, subzones may be established, preferably of equal area. Corresponding electrodes from all zones are ganged together using an electrical bus and create a phase retardation between adjacent subzones of $2\pi/p$ where p is the number of electrodes or subzones in each original phase-wrapped zone.

Sets of electrical buses of ganged electrodes may then be shunted together to create various diffractive lens structures. This permits wrapping points to be re-established by changing the number of subzones, with an ability to reset the phase retardation that the subzones create. This creates a new number of subzones, q. The bus-connected, i.e. ganged, electrode sets may be shunted together according to simple integer factors, m, into smaller numbers of sets. That is, p electrode sets are shunted to make q=p/m, p/m', ... electrode sets.

Thus, starting from p ganged electrode sets, the sets can be shunted together to make a new zone arrangement with q=(p/m) ganged electrode sets. Retarding step sequence is maintained to achieve the desired level of vision correction; as the distance from the center of the lens increases outward to the edge, electrode sets shunted equal values modulo q are maintained with respect to the original p electrode sets. For example, if the original electrode set p has 6 electrodes per subzones and a shift is desired to q=3 electrodes per subzone, the first set is shunted with the $4^{th}$, the $2^{nd}$ with the $5^{th}$ and the $3^{rd}$ with the $6^{th}$.

The combination of shunting along with the use of thin films of electro-active material creates the possibility of different integer factors m, which may correspond to optical powers, resulting in stepped optical powers that can be adjusted based on the number of subzones as a result of the electrode shunting, and creating a multi-focusing lens. Following the example of the previous paragraph, if the original set of 6 electrodes per subzone yielded an optical power of 1 Diopter, then shunting to achieve 3 electrodes per subzone with a similar applied voltage profile would result in 2 Diopters of power. This results in twice the number of subzones because the number of electrodes per subzone was halved. By maintaining the same amount of phase retardance over twice the number of subzones, the optical power is doubled. A lens of this configuration may provide far, intermediate, and near vision correction by shunting or un-shunting electrodes to change the focal length to achieve the desired level of vision correction.

Another embodiment provides for setting a phase delay in an electro-active lens of the present invention with thickness variations. In this embodiment, the applied voltage to each electrode loop may be tuned until the phase delay of the lens attains the desired value. Accordingly, individual loops may have different voltages applied constantly to create the appropriate phase delay. Alternatively, the same voltage may be applied to all the electrodes in a zone and different voltages applied to different zones.

Another embodiment provides for setting a different phase delay at the edges of a lens of the present invention because of oblique light rays. Oblique rays are light rays that are refracted by the lens and invariably travel outward through the lens edges. Accordingly, the oblique rays travel farther distances, such that they are significantly phase-delayed. In this embodiment, the phase delay may be compensated for by applying a predetermined constant voltage to the electrodes at the lens edges. Alternatively, the electrodes at the lens edges may create a voltage drop such that the refractive index at the edges is appropriately modified to compensate for the phase delay. This voltage drop may be achieved by tailoring the electrode conductivity or thickness accordingly, for example.

Based on the relatively small size of various zones used to provide different levels of vision correction, which may, for example have a diameter of about 10 mm, prismatic doubling may occur when an individual's line of sight falls near the edge of the zone. This may be overcome by a feathering process. In particular, with respect to Equations 2 and 3 above, the effective phase-wrapping or "grating" spacing (with reference to a diffractive lens analog) must decrease at larger values of $\rho$ to provide large diffraction deflection and bring common-origin rays to the same focal point. Gradually expanding the phase wrapping spacing from fixed focal length values as $\rho$ increases effectively feathers the focusing power, decreasing the prismatic doubling effect. Feathering may also decrease the rate at which pixel sizes decrease with increasing $\rho$, advantageously resulting in lower manufacturing costs.

It should be appreciated that the manner in which focusing power is altered is flexible. For example, it may occur as a sudden transition or a gradual reduction from a central fixed power to a very low power at the periphery of the electro-active area of the lens.

Returning now to FIG. 6, it may be understood that electrodes 600 are not limited to concentric loops, but may be any geometric shape or layout depending on the particular application, including pixels, for example. The layout may be restricted only by fabrication limitations, by electrical connection and electrode separation restrictions, and by the complexities of the interplay of the non-local elastic behavior of liquid crystal directors with electric fringe-fields at small dimensions. Additionally, the layout of electrodes 600 may be defined by the shape of the electro-active lens.

Figure 7:
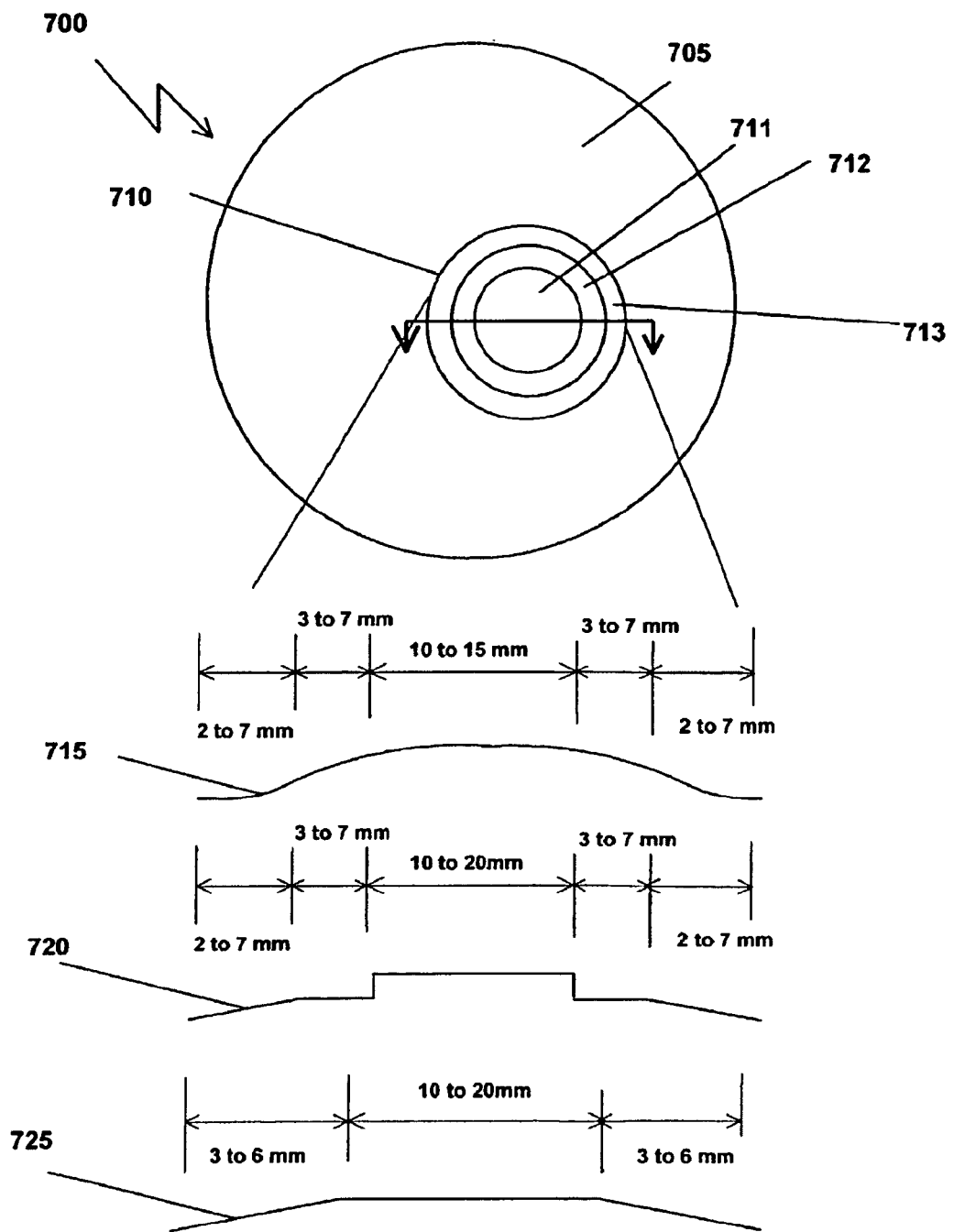
FIG. 7 illustrates exemplary power profiles of an electro-active lens in accord with another alternative embodiment of the present invention.

FIG. 7 illustrates examples of power profiles for an embodiment of the electro-active lens of the present invention. These power profiles may serve two purposes: to help hide the electro-active cell from an observer looking at the lens wearer and to provide intermediate power.

In this example, an electro-active lens 700 includes a distance-viewing portion 705 that makes up a majority of lens 700 and an electro-active cell portion 710 that is placed in an off center position with both vertical and horizontal de-centration. Electro-active cell 710 may include a central power zone 711, an intermediate power zone 712, and an outer power zone 713.

A power profile 715 illustrates a target profile for electro-active cell 710. Since cell 710 may be produced with either diffractive elements or discreet pixellation, the actual power profile may not be perfectly smooth such that there may be slight discontinuities between adjacent elements or pixels. In one embodiment, central zone 711 of cell 710 may mostly possess desired addition power and may be from 10 to 20 mm wide, with a preferred width of 10 to 15 mm. Moving outward from center zone 711 is intermediate zone 712, which may be a power transition area from 2 to 10 mm wide, with a preferred width of 3 to 7 mm. The center of intermediate zone 712 may be approximately one half the desired reading power. Outer zone 713 may be 1 to 10 mm wide with a preferred width of 2 to 7 mm and may be used to provide a transition from intermediate zone 712, having half addition power, to distance-viewing portion 705 where the power becomes the distance power.

Another power profile 720 illustrates another embodiment of electro-active cell 710. In this embodiment, central zone 711 may make up the reading zone and, preferably, be between 10 and 20 mm wide or wider. Outside of central zone 711, the power may drop to half the reading power in intermediate zone 712. Intermediate zone 712 may be from 2 to 10 mm wide, with a preferred width of 3 to 7 mm. Again, outer zone 713 may be used to blend from intermediate to distance power and may have a preferred width of 2 to 7 mm.

A third power profile 725 illustrates another embodiment of electro-active cell 710. In this embodiment, central zone 711 may again provide mostly the desired addition power, but may be much wider, perhaps as wide as 30 mm, with a preferred width between 10 and 20 mm. Intermediate and outer zones 712, 713 may be used to transition to the distance power and may combine for a preferred width of 3 to 6 mm.

It may be understood that there may be many power profiles. For example, if the electro-active area encompasses the entire lens as shown in FIG. 1, the transitioning and blending of powers could take place over a much larger dimension.

Identical or slightly different power profiles for each individual cell in an electro-active lens may be used to optimize the effective power profile of the lens. For example, in correcting birefringence, identical power profiles in each cell may be used.

It may be understood that an electro-active portion of a lens, the lens itself, or both the electro-active portion and the lens may be round, oval, elliptical, rectangular, square, half round, rectangular with rounded corners, inverted horseshoe-shaped, rectangular with the longer length in the vertical direction and the shorter length in the horizontal direction, a combination of geometric shapes, or any other geometric shape as desired for the particular application.

Figure 8:
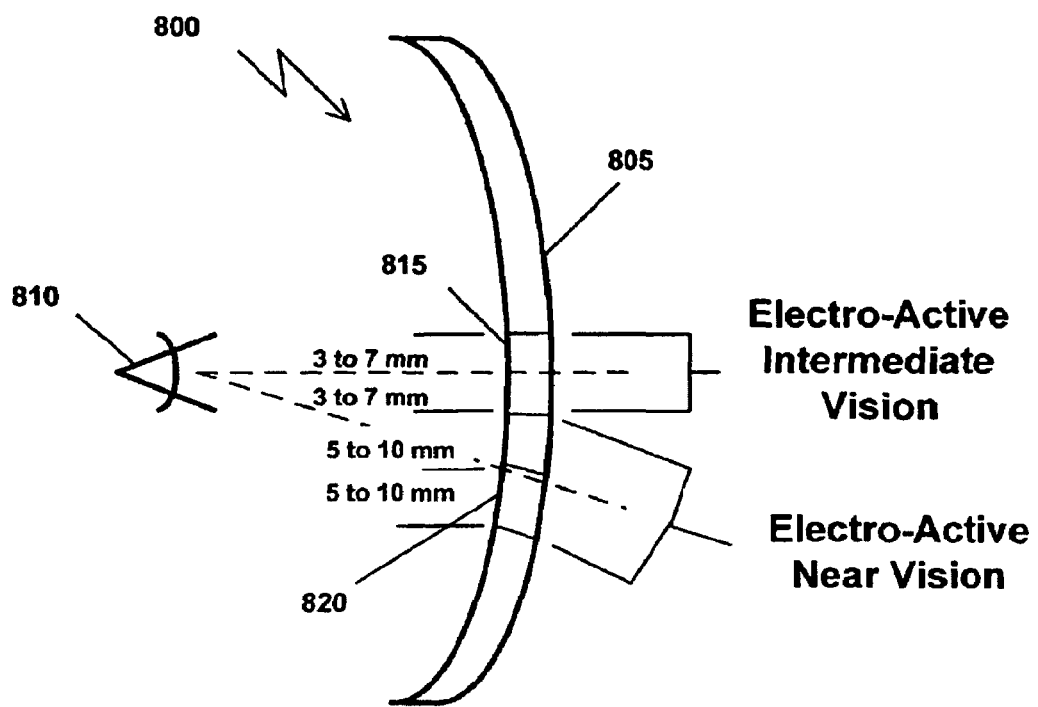
FIG. 8 is a side cross-sectional view of an electro-active lens that provides near and intermediate vision in accord with another alternative embodiment of the present invention.

FIG. 8 illustrates a side cross-sectional view of an electro-active lens with near and intermediate vision in accord with an embodiment of the present invention 800. In this embodiment, an electro-active lens 805 may be placed in front of an eye 810 of the lens wearer to serve as eyeglasses, for example. Accordingly, lens 805 may provide near, intermediate, and distance viewing to the lens wearer. When the electro-active cells are not optically activated, the power of the entire lens 810 may have the required refractive power to correct the distance vision of the lens wearer. When the electro-active cells are activated in such a way that the electro-active region becomes optically effective, an intermediate zone 815 can be centered essentially about the normal line of sight when the lens wearer of the electro-active lens is looking straight ahead. The vertical width of intermediate zone 815 can be between 6 and 15 mm (the sum of the two halves which are between 3 and 7 mm), with a preferred vertical width of 6 to 8 mm. A reading (or near) zone 820 of the electro-active region may be centered at a height that represents where the lens wearer is looking through the lens during normal reading posture, with roughly half the vertical width centered about this point on the lens. The vertical width of reading zone 820 can be between 10 and 20 mm, with a preferred vertical width of between 12 and 16 mm. The horizontal and vertical widths of reading zone 820 may be equal for a circular reading zone. The horizontal width of intermediate zone 815 may vary depending upon the size of reading zone 820 and the vertical width of intermediate zone 815.

Figure 9:
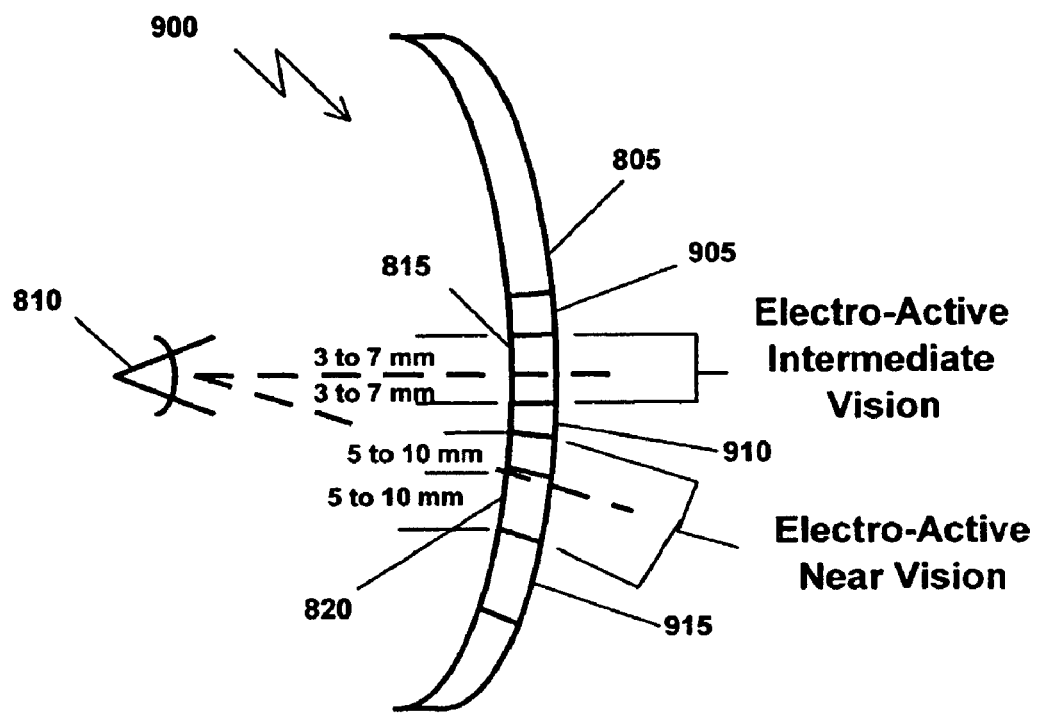
FIG. 9 is a side cross-sectional view of an electro-active lens that provides near and intermediate vision in accord with another alternative embodiment of the present invention.

FIG. 9 illustrates a side cross-sectional view of an electro-active lens with near and intermediate vision in accord with an alternate embodiment of the present invention 900. In this embodiment, electro-active lens 805 may be placed in front of eye 810 of the lens wearer to serve as eyeglasses, for example. Again, lens 805 may provide near, intermediate, and distance viewing to the lens wearer. This embodiment may provide blending zones 905, 910, 915 between intermediate and near vision zones, 815, 820 and the rest of the electro-active lens 805. These blending zones may advantageously improve the cosmetic quality of the power zone boundaries and, optionally, provide for an optically usable power transition.

For example, blending zone 905, perhaps between 2 and 8 mm wide, may be placed above the top of intermediate zone 815. Blending zone 910, perhaps between 2 and 6 mm wide, may be placed between intermediate zone 815 and reading (or near) zone 820. And blending zone 915 may be placed at the bottom of reading zone 820. If the electro-active region of lens 805 is circular and symmetric in power about the center of lens 805, then blending zone 915 may be a duplicate of blending zones 905, 910. On the other hand, if the electro-active region of lens 805 is asymmetric about the horizontal centerline of the electro-active region, then blending zone 915 may be just a continuous transition from the reading power to the distance power at the bottom of lens 805. In this case, blending zone 915 may be as small as 1 to 2 mm or as wide as the sum of the widths of intermediate zone 815 and blending zones 905, 910 on each side of intermediate zone 815. In fact, blending zone 915 may continue all the way to the lower edge of lens 805, if desired. The power profile of lens 805 may be a continuous power profile as illustrated by the line 715 in FIG. 7, for example. It may be understood that the power profiles as illustrated in FIG. 7 may be achieved with a patterned electrode, a physically machined or etched diffractive pattern, or any other similar mechanism.

An electro-active lens with near and intermediate power may advantageously provide addition power and/or intermediate power when the lens wearer needs it. For example, when the wearer is looking in the distance, the wearer may have the best possible distance correction with the widest field of view (the same high quality optics of a single vision lens). In contrast, this may not be the case for Progressive Addition Lenses (PALs). With a PAL design, the problem of unwanted distortion and image jump may not only compromise the size and quality of the reading and intermediate vision zones, but may also affect the distance vision zone. This may happen because many PAL designs allow a certain amount of distortion to creep into and around the distance vision zone to reduce the magnitude of the unwanted astigmatism in the lens. Such progressives are often referred to as "soft" designs in the industry. Thus, embodiments of the present invention may eliminate such a compromise, as seen in the PAL design, by making the near and/or intermediate vision zones electro-active.

In an embodiment of the present invention, an electro-active lens may be controlled by a range finder for automatic control of the electro-active zone. In this embodiment, the lens wearer may have both near and intermediate vision turned on automatically when looking at a near or intermediate object, and when the wearer looks at distant objects, the electro-active zone may be automatically turn off to provide only a distance optic.

In an alternate embodiment, an electro-active lens may include a manual override to override the range finder. In this embodiment, the manual override may be activated with a switch or a button on an electro-active lens controller. By pushing the button or switch, the wearer may manually override the range finder. The wearer may then manually switch to near or intermediate vision from distance vision. Alternatively, where the range finder senses that the wearer is looking at a near or intermediate object, but the wearer wishes to view something in the distance, the wearer may push the manual override switch or button to override the range finder control and return the electro-active lens to distance power. The manual override may advantageously allow the wearer to manually adjust the electro-active lens when, for example, the wearer tries to clean a glass window and the range finder does not detect the presence of the glass window in the near or intermediate distance.

Figure 10:
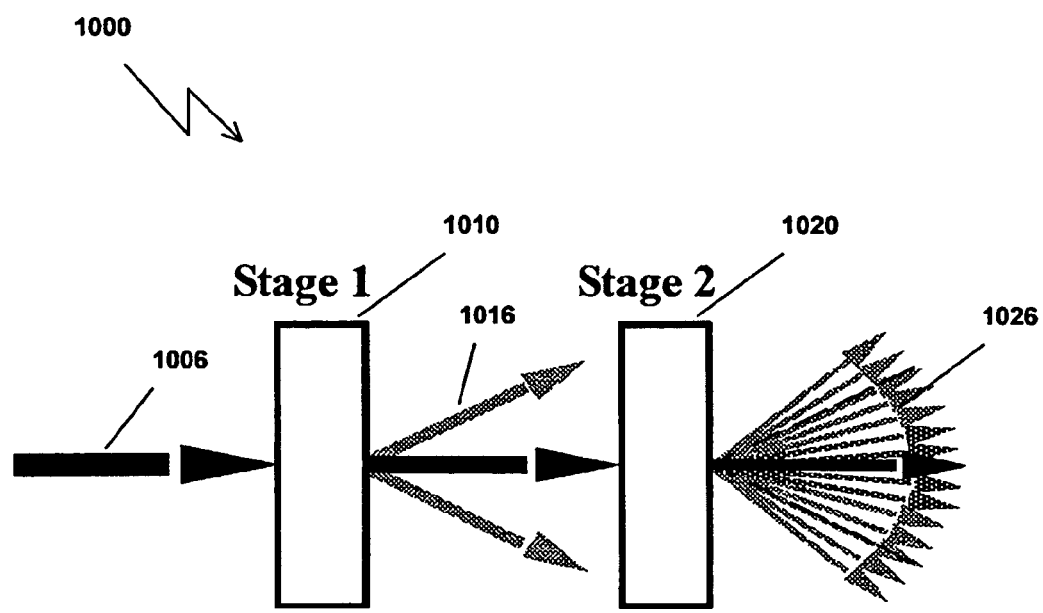
FIG. 10 is a cascade system of electro-active lenses in accord with another alternative embodiment of the present invention.

FIG. 10 is an illustration of an example cascade system of electro-active lenses in accord with an embodiment of the present invention. An embodiment of the present invention includes cascading electro-active lenses, which may provide a strategy for achieving high switching complexity by using sequential, simple) switching and/or programmable elements. These cascaded lens may be used in complex optical systems, e.g., laser optics, microscopes, etc, to effectively control variable refractive indices. As such, the number of connections for controlling a complex adaptive electronic lens and the number of control lines for controlling an optical beam through the lens may be reduced, while still providing more overall complex functionality of simpler elements in the cascade. Additionally, the cascade operation may allow for better diffraction efficiency, programming flexibility, and reduction in programming complexity. So, a linear sequence of R lenses, each capable of addressing N focal points, could address as many as $R_N$ resolvable focal points, assuming multiplicative resolution enhancement.

In FIG. 10, a two-stage cascade system 1000 includes two electro-active lenses 1010, 1020 in tandem. In an example, electro-active lens 1010 may have a resolution of N1 and electro-active lens 1020 may have a resolution of N2. So, the total resolution for cascade 1000 may be NR=N1*N2, such that cascade 1000 may be a multiplicative cascade. As such, incident light 1006 may pass through the first stage of cascade 1000, i.e., electro-active lens 1010, and be resolved into rays 1016. Rays 1016 may then pass through the second stage of cascade 1000, i.e., electro-active lens 1020, and be further resolved into rays 1026.

Electro-active lenses 1010, 1020 may include concentric transparent electrodes, e.g., loops, which may be programmed to provide a voltage distribution, which in turn activates electro-active material in lenses 1010, 1020 to produce a desired phase distribution. In an example, the lenses may provide a quadratic phase distribution in the radial direction. The quadratic phase function can be seen as a linear chirp applied to a linear phase function, where a linear phase function is a simple radial grating. Due to the chirp, the linear phase function may vary "faster" towards the edge of the lens. Hence, the quadratic phase function can be simplified by interpreting it as a one-dimensional function in the radial direction with the beam "deflection strength" increasing linearly from the optical axis towards the edges of the lens. For example, concentric loop electrodes may have a density of L electrodes per millimeter within an electro-active lens of diameter D mm. To achieve high diffraction efficiency, m-phase levels may be programmed such that there may be m electrodes per cell. Since the largest bending power of the electro-active lens may be used at the edge of the lens, there may be a limit on the F# that can be achieved for a given geometry. With m-phase levels, the period $\Lambda$ at the edge of the lens is $\Lambda$=m (1000 μm/L). So, the corresponding F#=$\lambda/\Lambda$ where $\lambda$ is the design wavelength. Thus, by cascading electro-active lenses 710, 720, smaller F# lenses can be achieved.

In conventional approaches to programming a cascade, there tends to be a loss in efficiency because the stages of the cascade are programmed independently. To overcome this problem, in an embodiment of the present invention, stages may be programmed jointly, using, for example, a discrete-offset-bias programming algorithm. This joint approach may advantageously eliminate any quantization error in the second stage of the cascade, thereby producing high diffraction efficiency.

Figure 11:
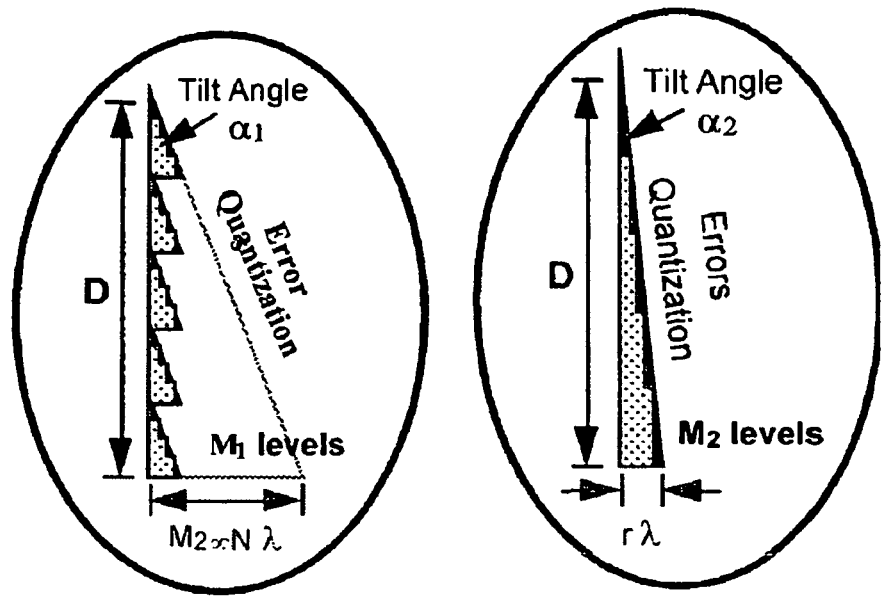
FIG. 11 illustrates error quantization produced in a conventional cascade system.

FIG. 11 illustrates error quantization produced by a conventional cascade, in which cascade stages are programmed independently. In this case, each element in the cascade has a quantization error, which due to the cascade operation, significantly affects the efficiency in the desired diffraction order and introduces side lobes in the higher diffraction orders, resulting in noise or blur.

Figure 12:
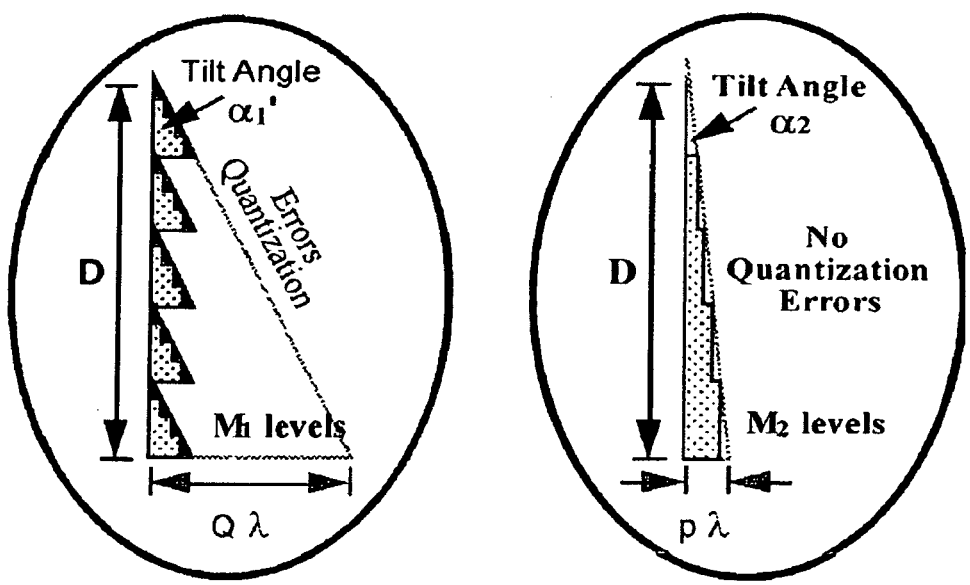
FIG. 12 illustrates error quantization eliminated by a cascade system of electro-active lenses in accord with another alternative embodiment of the present invention.

FIG. 12 illustrates the elimination of error quantization in a cascade in accord with the present invention, in which cascade stages may be programmed jointly. For example, a discrete-offset-bias algorithm may be used to program the electro-active lenses and optimize lens performance. The programming strategy may permit imperfect blazing on the elements of first lens 1010 in the cascade and correct any phase mismatches between different blazes by using constant phase shifts generated in second lens 1020 of the second stage. With this programming strategy, first lens 1010 may be programmed to aim incident light 1006 into the focal point of lens 1010 regardless of the error that will be introduced. This may result in an imperfect blaze in resulting rays 1016, which in turn may cause destructive interference, as well as missing the desired focal point. Second lens 1020 may then be programmed to introduce a constant phase offset to the tilted wave-front rays 1016 passed by stage 1, so that output rays 1026 from stage 2, all of the tilted wave fronts of the local beams, may be corrected in relative phase. With this form of cascade programming, the intensity of the central diffraction lobe of rays 1026 may be maximized, and no spurious noise lobes may be generated.

This programming approach may be applied to all of the electro-active lens designs described above, including a pixellated electrode pattern with addressable electrodes.

In certain exemplary embodiments of the invention, cholesteric liquid crystal configurations may be used to reduce birefringence with a single electro-active cell. Dual cell structures are typically used because unpolarized light is subjected to two different refractive powers when exposed to a cell containing a nematic liquid crystal. A single electro-active cell may be used in situations where a liquid crystal layer in an unactivated state is rotationally symmetric with respect to an incoming, unpolarized ray of light.

Although Twisted Nematic arrangements have been proposed because the optical rotary power of this arrangement will be high at thin liquid crystal thickness, such as a few microns thick. These arrangements do not typically appear rotationally symmetric. However, a cholesteric liquid crystal arrangement may be used to provide a quasi-randomized output polarization according to the following formula:

$$U = \Delta n \, P_0 / 2\lambda \quad (4)$$

where U is selected to be less than 1, and where $P_0$ is the pitch of the cell, which is related to the effective twist angle $\Theta_T$ by $$\Theta_T = 2\pi d / P_0 \quad (5)$$

where d is the thickness of the electro-active cell. Pitch may be adjusted from about 0.5 μm to about 50 μm by introducing a chiral component into the cholesteric liquid crystal cell at a concentration of about 20 to about 0.5% respectively.

A small U in Eq. (4) may be attained by having a small birefringence, $\Delta n$, or a short pitch $P_0$. The ultimate goal of reducing birefringence suggests reducing $\Delta n$ and increasing $P_0$ as far as possible. The total cell thickness may typically be about 10 μm, which means that a preferred pitch is equal to about 20 μm. Twist angle is typically equal to or greater than π radians to achieve a polarization-independent response of the cell.

Liquid crystal alignment layers in an electro-active lens can be produced to achieve either homogeneous (planar) and homeotropic (perpendicular) alignment. In an embodiment of liquid crystal layers having homogeneous alignment, ultraviolet sensitive materials may be irradiated with linearly polarized ultraviolet light and then put through a photophysical process to produce anisotropic surface anchoring forces. The resulting material has homogeneous alignment. One example of such a material is polyvinyl cinnamate. In an alternate embodiment, a thin polymer film may be mechanically rubbed to homogeneously align the material. One example of this material is polyvinyl alcohol.

In an embodiment of liquid crystal layers having homeotropic alignment, exemplary materials include a common biological compound called $_{L-\alpha}$-Phosphatidylocholine, commonly referred to as Lecithin, and octadecyltriethoxysilane (ODSE), a material with a long hydrocarbon chain that attaches itself to the surface of the substrate in a preferential manner. These materials make the surface of the active lens substrate hydrophobic, which in turn attracts the hydrophobic end of the liquid crystal molecules, causing them to align homeotropically.

Figure 13:
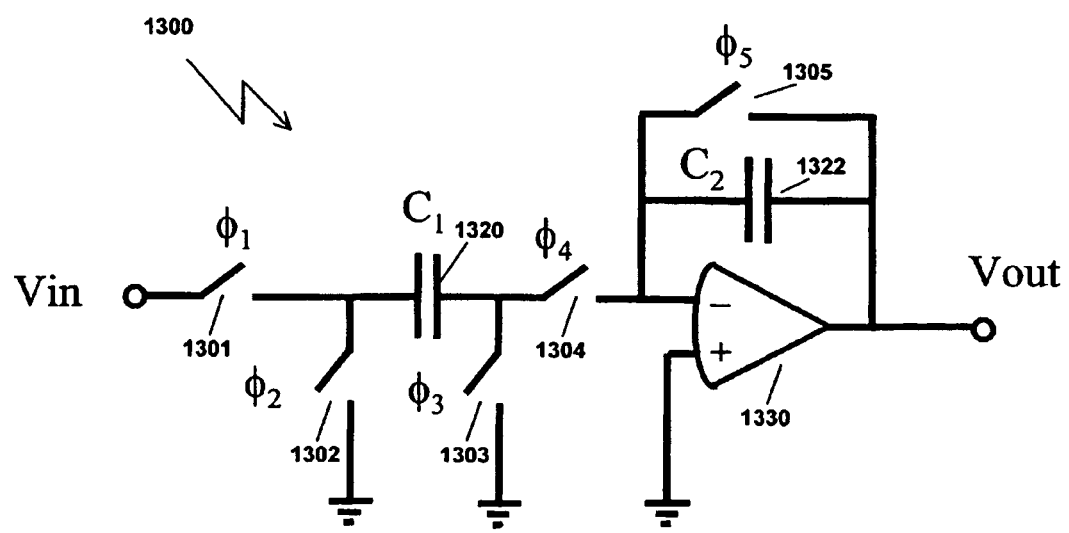
FIG. 13 illustrates a flying capacitor circuit to provide drive voltage waveforms to embodiments of an electro-active lens of the present invention.

FIG. 13 illustrates an embodiment of an electronic circuit that may be used to provide the drive voltage waveforms to embodiments of the electro-active lens in the present invention. In this embodiment, the electronic circuit is a "flying capacitor" circuit 1300. Flying capacitor circuit 1300 may include, for example, switches 1301–1305, capacitors 1320, 1322, and amplifier 1330. Switches 1301–1305 may be opened and closed to control the voltage applied to capacitors 1320, 1322 and amplifier 1330. As such, the phase of the output waveform from circuit 1300 may be controlled and retarded. This control phase retardation may be used to provide variable voltage to the electro-active lens. The use of flying capacitor circuit 1300 and its resulting waveforms may provide for variable peak-to-peak voltage of the output and a very small or no DC component to the resulting waveform. Hence, flying capacitor circuit 1300 may advantageously use control phase retardation to create a multifocus ophthalmic lens. The resulting waveforms may be square waves, for example, or any other waveforms capable of driving the electro-active lens, depending on the application for the lens.

Figure 14:
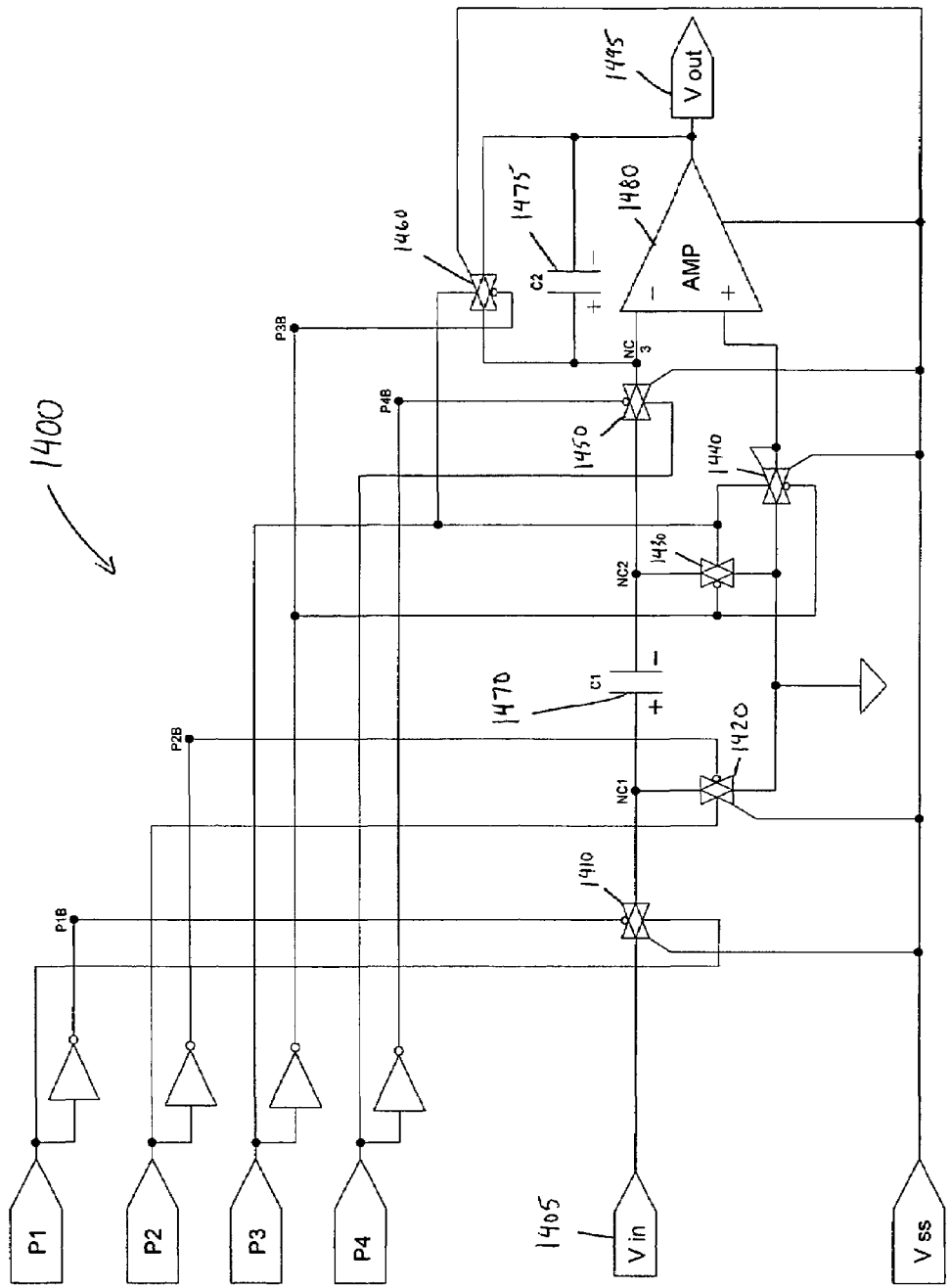
FIG. 14 illustrates a more detailed view of the flying capacitor circuit of FIG. 13.

Another view of the flying capacitor circuit of FIG. 13 is shown in schematic form in FIG. 14. The design of the circuit 1400 generates a high RMS value with a small or no DC component. The voltage signal is designed to have a low peak-to-peak voltage while maintaining a high RMS value. The voltage signal thus has a reduced battery consumption that may be advantageous for portable lenses. Varying the output intensity of the electronic signal allows for a change in index of refraction in electro-active lens.

The output waveform 1495 exiting the circuit 1400 is controlled by systematically controlling the CMOS switches 1410, 1420, 1430, 1440, 1450, 1460 in the circuit. The voltage is controlled as applied to capacitors 1470, 1475 and an amplifier 1480. The arrangement of the six CMOS switches within the circuit permits capacitors 1470, 1475 to be charged and discharged to produce an alternating voltage signal proportional to the input voltage 1405.

While various embodiments of the present invention have been presented above, other embodiments also in accordance with the same spirit and scope of the present invention are also plausible.

What is claimed is:

1. An electro-active lens comprising:
    a first electro-active cell; and
    a second electro-active cell; and
    a flying capacitor circuit connected to the electro-active cells to supply voltage having only alternating current in an activated state,
    wherein the first and second electro-active cells are adjacent to each other and aligned orthogonal to each other in an unactivated state, and
    wherein the electro-active lens is capable of being edged.

2. The electro-active lens of claim 1, wherein the flying capacitor circuit further comprises at least six CMOS transistors.

3. The electro-active lens of claim 2, wherein the flying capacitor circuit further comprises at least two capacitors, wherein the flying capacitor circuit is capable of providing a two-phase signal output.

4. An electro-active lens comprising at least one electro-active cell comprising phase-wrapped zones, wherein wrapping spacing from fixed focal length values expands as the radius of the phase-wrapped zones increases.

5. An electro-active lens comprising at least one electro-active cell, the electro-active cell further comprising subzones, each subzone defined by at least one electrode, wherein each subzone of the electro-active cell is of equal area, at least one electrical bus, wherein the electrodes of one subzone are ganged with the electrodes with at least one other subzone, multiple buses are shunted together, and the shunted buses are capable of re-establishing a wrapping point to create a new number of zones.

6. The electro-active lens of claim 5 wherein the step of phase retardation is $2\pi$ divided by the total number of zones.

7. An electro-active lens capable of being edged comprising at least one electro-active cell, wherein the electro-active cell comprises a cholesteric liquid crystal having a minimum twist angle of π radians.

8. The electro-active lens of claim 7 further comprising a pitch of less than or equal to about 20 micrometers.

9. An electro-active lens comprising at least one electro-active cell, wherein the electro-active cell comprises a cholesteric liquid crystal having a minimum twist angle of π radians, wherein the electro-active cell is connected to a source of alternating current, wherein the alternating current is phase and frequency synchronized at a voltage of less than about 10 V and at a frequency of less than about 10 KHz.

10. An electro-active lens comprising:
    at least one electro-active cell, the electro-active cell further comprising sub-zones, each subzone defined by at least one electrode, wherein each subzone of the electro-active cell is of equal area, at least one electrical bus, wherein the electrodes of one subzone are ganged with the electrodes with at least one other subzone, multiple buses are shunted together, and the multiple busses are shunted together according to integer factors.

11. The electro-active lens of claim 10 wherein the step of phase retardation is $2\pi$ divided by the total number of zones.

* * * * *